United States Patent Office 3,036,984
Patented May 29, 1962

3,036,984
ZEOLITE AND CURING ACCELERATOR, CHLORO-
PRENE POLYMER COMPOSITION CONTAINING
SAME, AND PROCESS OF CURING
Francis M. O'Connor, Kenmore, and Tudor L. Thomas,
Snyder, N.Y., assignors to Union Carbide Corporation,
a corporation of New York
No Drawing. Filed May 2, 1958, Ser. No. 732,464
29 Claims. (Cl. 260—41.5)

This invention relates to curing accelerators for neoprene rubbers. More particularly, this invention relates to an efficient and readily controlled method of utilizing thioamides as curing accelerators in neoprene rubber formulations.

Neoprene is the generic term applied to the group of synthetic elastomers based on the polymers of chloroprene, that is, 2-chlorobutadiene-1,3. Two particularly important classes of polychloroprene polymers are designated type G neoprenes and type W neoprenes. Type G neoprenes are sulphur-modified chloroprene-based synthetic elastomers and type W neoprenes are stabilized non-sulphur modified chloroprene-based synthetic elastomers. While the basic physical properties of cured neoprene are similar to those of natural rubber, the former surpasses natural rubber in certain other properties. For example, neoprene vulcanizates exhibit improved resistance to deterioration by oils, solvents, oxidation, sunlight, flexing, heat, and flame.

The crosslinking mechanism in neoprene vulcanization or cure is different from that in the curing of styrene-butadiene rubber and natural rubber. Metallic oxides such as zinc oxide and magnesium oxide are the most widely used curing agents for neoprene. The exact mechanism of the crosslinking reaction in neoprene, however, is not completely understood.

Many types of neoprene are available. The group of general-purpose neoprene formulations includes two classes, the sulfur-modified (type G) and the nonsulfur-modified (type W). The sulfur-modified neoprenes generally need only metallic oxides for curing. The nonsulfur-modified types require both metallic oxides and curing accelerators for the development of acceptable curing characteristics and vulcanizate properties. In processing neoprene, as well as other rubber compounds, the primary function of the accelerator is to increase the rate of curing. Accelerators can also affect the physical properties of the vulcanizate; in general, the tendency is toward providing an improvement in and uniformity of such properties.

Neoprene, like many other rubbers, is processed at elevated temperatures. During this processing, premature cure or "scorch" is a serious problem. Ideally, the accelerator should not be become active during the various stages of processing such as milling, extruding, and molding, that is, a long scorch time is desirable. However, the accelerator should be available upon demand to bring about rapid curing at the higher curing temperature, that is, short cure time.

In the prior art, curing accelerators mixed with an inert material such as clay have been added to rubber formulations. The use of such mixtures was designed to obtain more uniform dispersion of the accelerator in the formulation and thus provide more uniform physical properties in the cured product. However, as demonstrated by examples hereinbelow, such mixtures of curing accelerators with ordinary inert materials give at best only marginal improvements in scorch characteristics.

It is the principal object of this invention to provide a method for utilizing thioamides as accelerators to obtain rapid rates of cure in neoprene rubber formulations without a concomitant undesirable decrease in the scorch time.

It is a further object of this invention to provide means for varying the scorch time at a substantially constant rate of cure or for varying the rate of cure at a substantially constant scroch time, thus introducing a desirable flexibility into the processing conditions for these neoprene rubber formulations.

The invention is based upon the discovery that a certain class of solid materials combine with and retain the thioamides and may be used to introduce thioamide accelerators into the neoprene rubber formulations, whereby these accelerators are withheld from the formulation during the early stages of processing, thus preventing premature curing ("scorch") of the system, and when it is desired to cure (vulcanize) the system, the accelerator can be released from the solid material in at least one active form by the application of heat. An increase in the rate of cure can thus be obtained without an accompanying undesirable decrease in the scorch time. The possible active forms of the released accelerator include accelerator molecules and free radicals and ions derived from the molecules. The exact nature of the released accelerator is not known.

The solid materials which are useful in the present invention are crystalline zeolitic molecular sieves, both natural and synthetic. Crystalline zeolitic molecular sieves may be defined as three-dimensional alumino-silicates in which the rigid crystal structure is not destroyed, collapsed, nor substantially altered when essentially all of the water is removed from the pores within the crystal lattice.

Examples of synthetic molecular sieve zeolites which are useful in the present invention are zeolites A, B, D, L, R, S, X, and Y wherein the capital letter designates the particular type of three-dimensional crystal latttice.

The structure and properties of synthetic crystalline zeolitic molecular sieves are described in several publications, for example, Breck et al., Jour. Am. Chem. Soc., 78, 2338 (1956), Breck et al., Jour. Am. Chem. Soc., 78, 5963 (1956), and Reed et al., Jour. Am. Chem. Soc., 78, 5972 (1956). Synthetic crystalline zeolitic molecular sieves are also described in U.S. patents and co-pending U.S. patent applications. For example, zeolite A is described in U.S. Patent 2,882,243, issued April 14, 1959; zeolite X is described in U.S. Patent 2,882,244, issued April 14, 1959; zeolite L is described in application Serial No. 711,565, filed January 28, 1958; zeolite Y is described in application Serial No. 728,057, filed April 14, 1958; zeolite D is described in application Serial No. 680,383, filed August 26, 1957; zeolite R is described in application Serial No. 680,381, filed August 26, 1957; zeolite S is described in application Serial No. 724,843, filed March 31, 1958; and zeolite B is described in application Serial No. 400,387, filed December 24, 1953. Therefore, a complete description of these zeolites will not be given here.

To facilitate an understanding of the terms used in the examples and claims which follow some of the synthetic zeolitic molecular sieves are now more fully described. As used herein, the expressions "zeolite A," "zeolite X," "zeolite Y" and the like mean the chemical composition and X-ray diffraction patterns herein specifically set forth or referenced to the issued patent.

The chemical formula for zeolite B expressed in terms of oxide mole ratios may be written as:

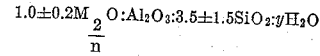

wherein M represents a metal, "$n$" its valence, and "$y$" may be any value up to 6 depending on the identity of the metal and the degree of dehydration of the crystal.

The more significant $d$-spacings of the X-ray powder diffraction pattern of zeolite B are shown in the following table.

| d (A.) |
|---|
| 7.10±0.1 |
| 4.97±0.1 |
| 4.10±0.1 |
| 3.18±0.1 |
| 2.68±0.08 |

The chemical formula for zeolite D may be written in terms of oxides, as follows:

$$0.9 \pm 0.2[x\text{Na}_2\text{O}:(1-x)\text{K}_2\text{O}]:\text{Al}_2\text{O}_3:w\text{SiO}_2:y\text{H}_2\text{O}$$

wherein "$x$" is a value from 0 to 1, "$w$" is from about 4.5 to about 4.9, and "$y$," in the fully hydrated form, is about 7. In the preferred form of zeolite D, "$x$" is in the range of from 0.4 to 0.6.

Zeolite D has an X-ray powder diffraction pattern substantially like that shown in the following table.

X-RAY DIFFRACTION PATTERNS OF ZEOLITE D

[d=interplanar spacing in A.:I/I max.=relative intensity]

| Zeolite D | | Zeolite D | |
|---|---|---|---|
| d, A. | I/I max. | d, A. | I/I max. |
| 9.42 | 66 | 3.19 | 15 |
| 6.89 | 67 | 2.94 | 100 |
| 5.54 | 15 | 2.69 | 9 |
| 5.03 | 62 | 2.61 | 38 |
| 4.33 | 62 | 2.30 | 16 |
| 3.98 | 27 | 2.09 | 22 |
| 3.89 | 23 | 1.81 | 29 |
| 3.60 | 12 | 1.73 | 23 |
| 3.45 | 39 | | |

The composition of zeolite L, expressed in terms of mole ratios of oxides, may be represented as follows:

$$1.0 \pm 0.1 \text{M}_{\frac{2}{n}}:\text{Al}_2\text{O}_3:6.4 \pm 0.5\text{SiO}_2:y\text{H}_2\text{O}$$

wherein "M" designates a metal, "n" represents the valence of "M"; and "y" may be any value from 0 to about 7.

The more significant d (A.) values, i.e., interplanar spacings, for the major lines in the X-ray diffraction pattern of zeolite L, are given below in the following table:

| d (A.) | |
|---|---|
| 16.1±0.3 | 3.28±0.02 |
| 7.52±0.04 | 3.17±0.01 |
| 6.00±0.02 | 3.07±0.01 |
| 4.57±0.03 | 2.91±0.01 |
| 4.35±0.04 | 2.65±0.01 |
| 3.91±0.02 | 2.46±0.01 |
| 3.47±0.02 | 2.19±0.01 |

The chemical formula for zeolite R may be written as:

$$0.9 \pm 0.2\text{Na}_2\text{O}:\text{Al}_2\text{O}_3:w\text{SiO}_2:x\text{H}_2\text{O}$$

wherein "$w$" is from 3.45 to 3.65, and "$x$," for the fully hydrated form, is about 7.

Zeolite R has an X-ray powder diffraction pattern substantially like that shown in the following table.

X-RAY DIFFRACTION PATTERNS OF ZEOLITE R

[d=interplanar spacing in A.:I/I max.=relative intensity]

| Zeolite R | | Zeolite R | |
|---|---|---|---|
| d, A. | 100 (I/I max.) | d, A. | 100 (I/I max.) |
| 9.51 | 88 | 2.95 | 100 |
| 6.97 | 35 | 3.89 | 16 |
| 5.75 | 16 | 2.80 | 14 |
| 5.61 | 26 | 2.71 | 14 |
| 5.10 | 45 | 2.66 | 10 |
| 4.75 | 12 | 2.62 | 25 |
| 4.37 | 78 | 2.53 | 22 |
| 4.13 | 12 | 2.39 | 10 |
| 4.02 | 14 | 2.14 | 6 |
| 3.92 | 35 | 2.10 | 14 |
| 3.80 | 16 | 1.93 | 10 |
| 3.63 | 41 | 1.89 | 10 |
| 3.48 | 25 | 1.82 | 18 |
| 3.34 | 12 | 1.76 | 6 |
| 3.21 | 18 | 1.73 | 16 |
| 3.13 | 12 | 1.69 | 4 |

The chemical formula for zeolite S may be written as:

$$0.9 \pm 0.2\text{Na}_2\text{O}:\text{Al}_2\text{O}_3:w\text{SiO}_2:x\text{H}_2\text{O}$$

wherein "$w$" is from 4.6 to 5.9 and "$x$," for the fully hydrated form, is from about 6 to 7.

Zeolite S has a characteristic X-ray powder diffraction pattern which may be employed to identify zeolite S. The X-ray powder diffraction data are shown in the following table.

X-RAY DIFFRACTION PATTERNS OF SYNTHETIC ZEOLITE S

[d=interplanar spacing in A.: I/I max.=relative intensity]

| d, A. | 100 (I/I max.) | d, A. | 100 (I/I max.) |
|---|---|---|---|
| 11.88 | 77 | 3.236 | 23 |
| 7.73 | 19 | 2.973 | 80 |
| 7.16 | 100 | 2.858 | 47 |
| 5.96 | 9 | 2.693 | 19 |
| 5.03 | 72 | 2.603 | 39 |
| 4.50 | 46 | 2.126 | 11 |
| 4.12 | 79 | 2.089 | 39 |
| 3.97 | 20 | 1.910 | 12 |
| 3.44 | 62 | 1.809 | 40 |
| 3.305 | 13 | 1.722 | 32 |

The chemical formula for zeolite Y expressed in terms of oxide mole ratios may be written as $$0.9 \pm 0.2\text{Na}_2\text{O}:\text{Al}_2\text{O}_3:w\text{SiO}_2:x\text{H}_2\text{O}$$

wherein "$w$" is a value greater than 3 up to about 5 and "$x$" may be a value up to about 9.

Zeolite Y has a characteristic X-ray powder diffraction pattern which may be employed to identify zeolite Y. The X-ray powder diffraction data are shown in the following table. The values for the interplanar spacing, d, are expressed in anstrom units. The relative intensity of the lines of the X-ray powder diffraction data are expressed as VS, very strong; S, strong; M, medium; W, weak; and VW, very weak.

| hkl | $h^2k^2+l^2$ | d in A. | Intensity |
|---|---|---|---|
| 111 | 3 | 14.3 –14.4 | VS |
| 220 | 8 | 8.73– 8.80 | M |
| 311 | 11 | 7.45– 7.59 | M |
| 331 | 19 | 5.67– 5.71 | S |
| 333, 511 | 27 | 4.75– 5.08 | M |
| 440 | 32 | 4.37– 4.79 | M |
| 620 | 40 | 3.90– 4.46 | W |
| 533 | 43 | 3.77– 3.93 | S |
| 444 | 48 | 3.57– 3.79 | VW |
| 551, 711 | 51 | 3.46– 3.48 | VW |
| 642 | 56 | 3.30– 3.33 | S |
| 553, 731 | 59 | 3.22– 3.24 | W |
| 733 | 67 | 3.02– 3.04 | M |
| 660, 822 | 72 | 2.91– 2.93 | M |
| 555, 751 | 75 | 2.85– 2.87 | S |
| 840 | 80 | 2.76– 2.78 | M |
| 753, 911 | 83 | 2.71– 2.73 | W |
| 664 | 88 | 2.63– 2.65 | M |
| 931 | 91 | 2.59– 2.61 | M |
| 844 | 96 | 2.52– 2.54 | VW |
| 862; 10, 2, 0 | 104 | 2.42– 2.44 | VW |
| 666; 10, 2, 2 | 108 | 2.38– 2.39 | M |
| 775; 11, 1, 1 | 123 | 2.22– 2.24 | VW |
| 880 | 128 | 2.18– 2.20 | W |
| 955; 971; 11, 3, 1 | 131 | 2.16– 2.18 | VW |
| 973; 11, 3, 3 | 139 | 2.10– 2.11 | W |
| 884; 12, 0, 0 | 144 | 2.06– 2.07 | VW |
| 886; 10, 8, 0; 12, 4, 2 | 164 | 1.93– 1.94 | VW |
| 10, 8, 2 | 168 | 1.91– 1.92 | VW |
| 995; 13, 3, 3 | 187 | 1.81– 1.82 | VW |
| 11, 7, 5; 13, 5, 1 | 195 | 1.77– 1.78 | VW |
| 10, 8, 6; 10, 10, 0; 14, 2, 0 | 200 | 1.75– 1.78 | W |
| 997; 11, 9, 3 | 211 | 1.70– 1.71 | W |

Examples of naturally occurring crystalline zeolitic molecular sieves which are useful in the present invention are faujasite, analcite, erionite, chabazite, mordenite, phacolite, clinoptilolite, harmotone, and gmelinite.

The accelerators are retained on the solid materials of this invention in some type of closely bound relation. However, as discussed in more detail hereinbelow, the exact nature of this closely bound relation is not known. It can be shown, however, that the retention of the accelerators is not primarily dependent upon adsorption within the porous structure of the solid. Also, the retention appears to be more than mere surface adsorption as shown by the discovery that preheating the composition comprising the solid material and retained accelerator at temperatures between about 75° C. and 150° C. improves the processing characteristics of the neoprene formulation. The particular temperatures used would, of course, be determined by the nature of the individual accelerator used.

The accelerators of the present invention are thioamides having the formula

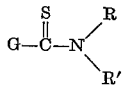

wherein R and R' are groups selected from the class consisting of hydrogen, alkyl, aryl, cycloalkl, aralkyl, alkaryl, and alkenyl, and G is a group selected from the class consisting of hydrogen, R-groups and

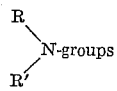

wherein R and R' have the meanings defined hereinabove. The total number of carbon atoms in the accelerator molecule should be less than about twenty-five. Examples of the accelerators of this invention are the following:

Thiourea, $H_2N$—$CSNH_2$
Thioformamide, $H$—$CSNH_2$
1,3-diethyl thiourea, $C_2H_5NHCSNHC_2H_5$
1,3-dibutyl thiourea, $C_4H_9NHCSNHC_4H_9$
1,3-diphenyl thiourea, $C_6H_5NHCSNHC_6H_5$
1,3-diisopropyl thiourea, $C_3H_7NHCSNHC_3H_7$
1,1,3-trimethyl thiourea, $(CH_3)_2NCSN(CH_3)_2$
1,1,3,3-tetraphenyl thiourea, $(C_6H_5)_2NCSN(C_6H_5)_2$
Cyclohexyl thioamide, $C_6H_{11}CSNH_2$
Ethyl, N,N'-diethyl thioamide, $C_2H_5CSN(C_2H_5)_2$
Allyl thioamide, $C_3H_5CSNH_2$ Another accelerator useful in the present invention is the commercially available (Du Pont Company) thioamide-containing compound designated and known as "Na-33." The exact composition of this compound is now known, but it is believed to contain cyclohexyl thioamide, $C_6H_{11}CSNH_2$.

It is pointed out that all the accelerators of the present invention contain the grouping

substituted with a wide variety of hydrocarbon and amide groups.

In one embodiment of this invention, a quantity of crystalline zeolitic molecular sieve which prior to processing has been combined with the accelerator, is added to the rubber formulation. The crystalline zeolite retains the accelerator until vulcanization temperatures are reached. This is a preferred embodiment of the invention. In another embodiment of this invention, the accelerator and crystalline zeolite are added separately to the rubber formulation. The zeolite then combines with the accelerator in situ and retains it during pre-vulcanization processing and until curing temperatures are reached.

One embodiment of the present invention is set forth by the experimental data of Table A, below, wherein the effects on scorch time and rapidity or cure for no accelerator, accelerators not retained on solid material, and various operable accelerators of this invention retained on various types of solid material are compared. The nature of the neoprene formulations and the details of the experimental methods are discussed immediately following the table. In the table sodium X designates the sodium form of zeolite X, calcium A designates the calcium form of zeolite A, and so on for the other synthetic crystalline zeolitic molecular sieves used in this invention.

TABLE A.—EFFECT OF MOLECULAR SIEVE AND OTHER CARRIERS ON CURE AND SCORCH CHARACTERISTICS OF TYPE W NEOPRENE

| Accelerator | Conc. of accelerator (phr.[1]) | Solid material | Weight percent accelerator on molecular sieve | Mooney scorch time [2] at 250° F. (min. to 5-pt. rise) | Press cure at 307° F, stress at 300% (p.s.i.) | | |
|---|---|---|---|---|---|---|---|
| | | | | | 5 min. | 7 min. | 10 min. |
| None | | | | 30 | ([3]) | ([4]) | ([4]) |
| NA-33 | 0.5 | | | 12 | 1,333 | 1,795 | 1,900 |
| NA-33 | 1.0 | | | 11 | 1,926 | 2,350 | 2,429 |
| NA-33 | 0.5 | Sodium X | 20 | 20 | 1,190 | 1,531 | 1,659 |
| NA-33 | 1.0 | do | 20 | 18 | 1,975 | 2,000 | 2,150 |
| NA-33 | 1.0 | Zeolex-20 [5] | | 14 | 1,882 | 2,000 | 2,120 |
| NA-33 | 1.0 | Attasorb LVM [6] | | 14.5 | 1,783 | 2,050 | 2,293 |
| NA-33 | 0.6 | Calcium X | 20 | 16.5 | 1,515 | 1,610 | 1,512 |
| NA-33 | 0.6 | Sodium A | 20 | 22 | 1,872 | 1,835 | 1,974 |
| NA-33 | 0.6 | Calcium A | 20 | 18 | 2,103 | 2,150 | 2,148 |
| 1,3-diethyl thiourea | 0.5 | | | 6 | 1,275 | 1,647 | 1,760 |
| Do | 0.5 | Sodium X | 20 | 18.5 | 1,196 | 1,584 | 1,519 |
| 1,3-diisopropyl thiourea | 0.5 | | | 6.5 | 834 | 950 | 850 |
| Do | 0.5 | Sodium X | 15 | 20.5 | 730 | 890 | 950 |
| Thiourea | 0.5 | | | 9.5 | 557 | 675 | 821 |
| Do | 0.5 | Sodium X | 15 | 25 | 524 | 734 | 1,268 |
| 1,3-dibutyl thiourea | 0.5 | | | 8 | 1,210 | 1,580 | 1,692 |
| Do | 0.5 | Sodium X | 20 | 20.5 | 780 | 974 | 1,105 |
| 1,3-diphenyl thiourea | 0.5 | | | 8 | 1,120 | 1,403 | 1,370 |
| Do | 0.5 | Sodium X | 20 | 25.5 | 1,125 | 1,024 | 1,185 |
| 1,1,3-trimethyl thiourea | 0.75 | | | 9.5 | 1,147 | 1,436 | 1,690 |
| Do | 0.75 | Sodium X | 15 | 32 | 820 | 1,100 | 1,425 |
| Do.[7] | 0.75 | | | 10 | 1,114 | 1,090 | 1,040 |
| Do.[7] | 0.75 | Sodium X | 15 | 22.5 | 1,570 | 1,710 | 1,880 |

[1] Parts of accelerator per hundred parts of rubber.
[2] Number of minutes required (at given temperature) to reach a 5-point increase in the viscosity of the sample above the minimum viscosity of that sample as determined in a Mooney viscometer.
[3] Modulus was 462 p.s.i. after 15 minutes at 307° F.
[4] No cure.
[5] An amorphous zeolite comprising hydrated sodium calcium silico-aluminate; 20 wt.% loading of accelerator.
[6] A modified Attapulgite clay, heated to 1800° C. to drive off volatile matter; 20 wt.% loading of accelerator.
[7] This formulation contained 75 phr. hard clay in place of the 30 phr. SRF black used in all other formulations in this table. See Table B.

Table A shows that the neoprene formulation cured very slowly in the absence of accelerators. When the accelerator was added in the conventional manner, a very rapid cure resulted at the expense of a sharp decrease in scorch time. Combining the accelerator with the solid zeolites calcium X, sodium X, calcium A, and sodium A, however, resulted in a substantial increase in scorch time while a rapid rate of cure was maintained.

Table A also shows that the pore size of the crystalline zeolitic molecular sieve is not the controlling factor in the retention of the curing accelerator. Zeolites sodium X and calcium X have pores sufficiently large to admit accelerator molecules while the pores of sodium A and calcium A are too small to admit such molecules. Also, the data of Table A show no correlation between pore size and processing characteristics for these zeolites.

Table A further shows that the use of amorphous zeolites or clays as solid carriers for the curing accelerators of this invention gives only marginal improvement in the scorch time.

The constituents of the neoprene formulation used in the experiments recorded in Table A, above, are listed in Table B. This neoprene rubber used is designated "type W" in the trade. The W types of neoprene, which include W, WRT, and WHV, contain no sulfur, sulfur compounds, or other compounds which could decompose to release free sulfur or form accelerators. The neoprene formulation of Table B is a typical formulation used to define the cure and scorch characteristics of commercial accelerators. Many other compounding ingredients such as fillers of clay or other materials may be added to develop specific properties in the final product. The present invention is not limited to any particular member of the W class of neoprenes or to any particular formulation recipe, but is applicable to formulations containing any nonsulfur-modified (W type) neoprene rubber as well as G-type neoprenes which contain sulfur or sulfur compounds.

TABLE B.—A BASIC RECIPE FOR TYPE W NEOPRENE FORMULATION

| Ingredient | Amount Used, Parts | Function |
| --- | --- | --- |
| Neoprene type W | 100 | Polymer. |
| Semi-reinforcing carbon black (SRF) | 30 | Reinforcing agent. |
| Neozone A (Phenyl-alpha-naphthylamine) | 1.0 | Antioxidant. |
| Stearic acid | 0.5 | Activator and softener. |
| Zinc oxide | 5.0 | Vulcanizing (curing) agent. |
| Magnesium oxide | 2.0 | Do. |
| Accelerator | Variable | Shorten cure time. |

A typical experiment using this basic neoprene formulation is described in Example I.

*Example I*

COMPOUNDING OF TYPE W NEOPRENE FORMULATION USING NA–33 CARRIED ON MOLECULAR SIEVE TYPE SODIUM X AS ACCELERATOR

From a masterbatch consisting of 100 parts neoprene W and 30 parts of semi-reinforcing carbon black, 390 grams were blended on a 6-inch by 12-inch laboratory 2-roll mill. To this were added 15.0 grams of zinc oxide, 1.5 grams of stearic acid, 6.0 grams magnesium oxide, and 12.0 grams of molecular sieve type sodium X carrying NA–33 (12.6 wt.-percent NA–33). The formulation was compounded according to the ASTM standard mixing procedure (reference ASTM Standards on Rubber Products D–15–55T).

After mixing, the sample was removed from the roll mill in a sheet and a sample cut for determination of Mooney scorch time at 250° F. Mooney scorch time at a given temperature is the number of minutes required to reach a 5-point increase in the viscosity of the sample above the minimum viscosity of that sample as determined in a Mooney shearing disc viscometer. This measurement was conducted according to ASTM Standards on Rubber Products D–927–55T.

The physical properties of the vulcanized product were obtained by curing 6-inch by 6-inch by 0.075-inch slabs of rubber in a standard 4-cavity test mold at 307° F. for measured periods of time. The tensile tests were conducted according to ASTM Standards on Rubber Products D–412–51T.

The Mooney scorch time for this formulation was 20 minutes. The physical properties of the cured samples after various periods of time at 307° F. are given below:

| Cure time (min.) | Stress at 300% elongation (p.s.i.) | Ultimate tensile (p.s.i.) | Ultimate elongation (percent) |
| --- | --- | --- | --- |
| 5 | 1,570 | 3,100 | 530 |
| 7 | 1,795 | 3,084 | 470 |
| 10 | 1,926 | 2,927 | 430 |

These data indicate a well-cured product was obtained in 5 minutes at 307° F. In the absence of an accelerator, very little cure was obtained, even in 15 minutes at 307° F. Addition of NA–33 alone, while it produced a rapid cure, gave a Mooney scorch time of only 12 minutes compared to 20 minutes for NA–33 carried on molecular sieve type sodium X.

In a similar manner, sodium zeolite X carrying, respectively, thiourea, diethyl thiourea, diisopropyl thiourea, dibutyl thiourea, diphenyl thiourea, and trimethyl thiourea were compounded into neoprene formulations, with the results as listed in Table A of this disclosure.

The accelerator may be combined with the solid by blending or other convenient method, such as spray loading or adsorption from solution. A typical example of loading the accelerator is given in Example II.

*Example II*

COMBINING DIISOPROPYL THIOUREA WITH SODIUM ZEOLITE X

In a 1-quart porcelain ball mill containing 1-inch porcelain balls for grinding, there were placed 85 grams of activated molecular sieve type sodium X powder and 15 grams of diisopropyl thiourea. The ball mill was sealed and blended on a roller for 90 minutes at room temperature. During this time no temperature change or color change was noted. The resulting product was a uniform white powder containing 15 wt.-percent diisopropyl thiourea.

In the same manner, thiourea, diethyl thiourea, dibutyl thiourea, and diphenyl thiourea were combined with activated molecular sieve type sodium X powder.

The embodiment of this invention wherein accelerator combined with solid is added to the rubber formulation is further exemplified by the data in Table C. The experimental methods were similar to those described in Example I, above.

concentrations. These data indicate that the best combination of scorch and cure are obtained when enough loaded powder is added to give about 0.4 phr. diethyl thiourea.

TABLE C.—EFFECT OF WT.-PERCENT CONCENTRATION OF ACCELERATOR ON SODIUM X AT A CONSTANT CONCENTRATION OF ACCELERATOR IN THE FORMULATION

| Accelerator | Weight-Percent accelerator on sodium X | Phr. accelerator in recipe | Phr. sodium X in recipe | Mooney scorch time at 250° F. (min. to 5-pt. rise) | Press cure at 307°F, stress at 300% elongation (p.s.i.) | | |
|---|---|---|---|---|---|---|---|
| | | | | | 5 min. | 7 min. | 10 min. |
| NA-33 | | 1.0 | | 11 | 1,762 | 1,976 | 2,136 |
| | 10 | 1.0 | 10.0 | 16 | 1,762 | 1,721 | 1,756 |
| | 20 | 1.0 | 5.0 | 16.5 | 1,902 | 1,951 | 2,167 |
| | 25 | 1.0 | 4.0 | 20.5 | 1,500 | 1,775 | 1,975 |
| | 50 | 1.0 | 2.0 | 16.5 | 1,870 | 1,928 | 2,000 |
| | 75 | 1.0 | 1.3 | 13 | 1,880 | 2,000 | 2,143 |
| Diethyl thiourea | | 0.5 | | 6 | 1,275 | 1,647 | 1,760 |
| | 25 | 0.5 | 1.5 | 17 | 1,175 | 1,450 | 1,620 |
| | 20 | 0.5 | 2.0 | 18.5 | 1,196 | 1,584 | 1,520 |
| | 17 | 0.5 | 2.4 | 20.5 | 988 | 1,570 | 1,792 |
| | 15 | 0.5 | 2.8 | 25 | 900 | 1,200 | 1,317 |
| | 10 | 0.5 | 4.5 | 49 | | 615 | 810 |

Table C shows that at a constant concentration of accelerator in the recipe the scorch time was controlled by the amount of accelerator retained by the solid material. Table C shows that at 1.0 phr. of NA-33 in the formulation concentrations up to 50 wt.-percent NA-33 on sodium X gave accelerators which were superior to NA-33 alone. Increasing the concentration to 75 wt.-percent NA-33 gave an accelerator activity which has cure and scorch characteristics equivalent to pure NA-33. The optimum concentration of NA-33 on sodium X is about 25 wt.-percent. This concentration has consistently resulted in the best combination of cure and scorch characteristics.

For diethyl thiourea, Table C shows that the scorch time obtained in a black neoprene W formulation decreases as the weight-percent loading of diethyl thiourea on sodium X increases. However, even at 25 wt.-percent diethyl thiourea, the scorch time is still considerably longer than with pure diethyl thiourea. The rate of cure increases with increasing weight-percent loading of diethyl thiourea up to 17 wt.-percent, at which point it is equivalent to the pure accelerator. Even at 15 wt.-percent loading, the rate of cure is very rapid. At 10 wt.-percent loading, however, the cure rate is quite slow although still considerably faster than a formulation containing no accelerator. The preferred loading range, therefore, is about 15 wt.-percent to 25 wt.-percent for this accelerator.

Increasing the amount of accelerator-loaded sodium X powder in the recipe at a constant loading of accelerator, on the other hand, resulted in an increase in cure rate with little effect on the scorch time. Table D shows that the scorch time of a black neoprene W formulation containing molecular sieve type sodium X powder loaded to 20 wt.-percent with diethyl thiourea is independent of the amount of loaded powder added to the recipe, that is, increasing the concentration of loaded powder from 1.0 to 4.0 phr. gave essentially an unchanged scorch time. However, a faster rate of cure is obtained at the higher TABLE D.—EFFECT OF CONCENTRATION OF SODIUM X POWDER CARRYING DIETHYL THIOUREA IN FORMULATION AT A CONSTANT WT.-PERCENT LOADING OF DIETHYL THIOUREA ON SODIUM X

| Weight-percent diethyl thiourea on Sodium X | Phr. diethyl thiourea in recipe | Phr. sodium X in recipe | Mooney scorch time at 250° F. (min. to 5 Pt. Rise) | Press cure at 307° F., stress at 300% elongation (p.s.i) | | |
|---|---|---|---|---|---|---|
| | | | | 5 min. | 7 min. | 10 min. |
| 20 | 0.2 | 0.8 | 20 | 875 | 1,025 | 1,150 |
| 20 | 0.4 | 1.6 | 20 | 1,098 | 1,400 | 1,500 |
| 20 | 0.6 | 2.4 | 19 | 1,195 | 1,457 | 1,740 |
| 20 | 0.8 | 3.2 | 18 | 1,143 | 1,538 | 1,821 |

It is thus a basic feature of the invention, as illustrated by the data in Tables C and D hereinabove, that the scorch time necessary for adequate processing safety in neoprene compounding can be obtained by choosing the appropriate amount of accelerator retained by the solid material (that is, the accelerator-solid ratio), while the cure rate can be controlled by the amount of powdered accelerator-retaining material in the recipe. This independant control of cure rate and scorch time may be obtained by adding accelerator-retaining solid material to the formulation or by adding separate quantities of accelerator and solid material to the formulation and allowing retention to take place in situ.

The embodiment of this invention wherein accelerator and crystalline zeolitic molecular sieve are added separately is set forth by the data in Table E. In this embodiment the solid combines with the accelerator in situ and retains it in an inactive state until vulcanization temperatures are reached.

The experimental procedures used in obtaining the data in Table E are illustrated in Example III and IV which follow the table.

TABLE E.—EFFECT OF ACCELERATOR AND SOLID ADDED SEPARATELY TO THE FORMULATION

| Accelerator | Molecular sieve type | Phr. solid added | Calculated concentration of accelerator on solid (weight percent) | Mooney scorch time at 250° F. (min. to 5-pt. rise) | Press cure at 307° F., stress at 300% elongation | | |
|---|---|---|---|---|---|---|---|
| | | | | | 5 min. | 7 min. | 10 min. |
| NA-33 | | | | 11 | 1,926 | 2,350 | 2,429 |
| | Sodium X | 3.0 | 25 | 23 | 2,000 | 2,123 | 2,228 |
| | Calcium X | 3.0 | 25 | 16.5 | 2,000 | 2,123 | 2,205 |
| | Potassium X | 3.0 | 25 | 14.5 | 2,103 | 2,177 | 2,222 |
| | Sodium Y | 3.0 | 25 | 17 | 1,877 | 2,175 | 2,308 |
| | Sodium A | 3.0 | 25 | 18.5 | 2,265 | 2,313 | 2,370 |
| | Calcium A | 3.0 | 25 | 18 | 2,074 | 2,220 | 2,222 |
| Diethyl thiourea | | | | 6 | 1,275 | 1,647 | 1,760 |
| | Sodium X | 3.0 | 14 | 26.5 | 769 | 980 | 1,380 |

*Example III*

COMPOUNDING OF TYPE W NEOPRENE FORMULATION WITH NA-33 AND ZEOLITIC MOLECULAR SIEVE ADDED SEPARATELY

From a masterbatch consisting of 100 parts neoprene W and 30 parts of semi-reinforcing carbon black, 390 grams were blended on a 6-inch by 12-inch laboratory 2-roll mill. To this were added 15.0 grams of zinc oxide, 1.5 grams of stearic acid, 6.0 grams magnesium oxide (Maglite D), 3.0 grams of Du Pont's NA-33 accelerator and 9.0 grams molecular sieve type sodium X activated powder. The formulation was compounded according to the ASTM standard mixing procedure (reference ASTM Standards on Rubber Products D-15-55T).

After mixing, the sample was removed from the roll mill in a sheet and a sample cut for determination of Mooney scorch time at 250° F. The scorch time and physical properties were determined by the methods of the references cited in Example I hereinabove.

The Mooney scorch time for this formulation was 19 minutes. The physical properties of the cured samples after various periods of time at 307° F. are given below:

| Cure Time (min.) | Stress at 300% elongation (p.s.i.) | Ultimate tensile (p.s.i.) | Ultimate elongation (percent) |
|---|---|---|---|
| 5 | 2,150 | 2,900 | 405 |
| 7 | 2,195 | 3,000 | 415 |
| 10 | 2,410 | 2,850 | 350 |

These data indicate a well-cured product was obtained in 5 minutes at 307° F. In the absence of an accelerator, very little cure was obtained even in 15 minutes at 307° F. Addition of 1.0 phr. NA-33 alone, while it produced a rapid cure, gave a Mooney scorch of only 7 minutes compared to 19 minutes when molecular sieve type sodium X was also added.

*Example IV*

COMPOUNDING OF TYPE W NEOPRENE FORMULATION WITH DIETHYL THIOUREA AND ZEOLITIC MOLECULAR SIEVE ADDED SEPARATELY

This experiment was carried out in a neoprene W formulation in which a natural whiting instead of carbon black was used as the filler. From a masterbatch consisting of 100 parts neoprene W, 44 parts of natural whiting (calcium carbonate) and 1.0 part neozone A (antioxidant), 435 grams were blended on a 6-inch by 12-inch laboratory 2-roll mill. To this were added 15.0 grams zinc oxide, 1.5 grams stearic acid, 6.0 grams magnesium oxide, 1.5 grams 1,3-diethyl thiourea, and 6.0 grams molecular sieve type sodium X activated powder. This formulation was compounded according to ASTM D-15-55T.

The scorch time and physical properties were determined according to the methods cited in Example I above.

The Mooney scorch time for this formulation was 21 minutes. The physical properties of the samples after curing at 307° F. were:

| Cure Time (min.) | Stress at 300% elongation (p.s.i.) | Ultimate tensile (p.s.i.) | Ultimate elongation (percent) |
|---|---|---|---|
| 7 | 250 | 1,950 | 845 |
| 10 | 295 | 1,800 | 795 |
| 15 | 300 | 1,725 | 775 |

These data show that a well-cured product was obtained in 7 minutes. In the absence of an accelerator, no cure is obtained in 15 minutes. Addition of diethyl thiourea alone, while it gave an equivalent cure to that obtained in this example, gave a Mooney scorch time of only 7 minutes.

We have also discovered that when crystalline zeolitic molecular sieves which have been combined with thioamide accelerators are heated at between about 75° C. and 150° C. for several hours, scorch time and cure rate characteristics are improved by an additional amount over those obtained in the absence of this preheating step. Table F shows that after heating 2 hours at 100° C., NA-33 loaded sodium X, sodium A, and two noncrystalline clay materials, showed varying degrees of improvement in processing safety (longer scorch time) than NA-33 alone and also gave rapid rates of cure. The degree of improvement achieved by this heat treatment was about the same for the crystalline zeolitic molecular sieves. Attapulgite clay and the amorphous zeolite carrying NA-33, however, offered no improvement over NA-33 alone after they were heated in a similar manner.

TABLE F.—EFFECT OF HEATING ACCELERATOR COMBINED WITH SOLID BEFORE INCORPORATING INTO TYPE W NEOPRENE FORMULATIONS

[Concentration of accelerator combined with solid=25 wt.-percent]

| Solid | Phr. NA-33 in recipe | Phr. solid in recipe | Time NA-33-solid combination heated at 100° C., hr. | Mooney scorch time at 250° F. (min. to 5-pt. rise) | Press cure at 307° F., stress at 300% elong. (p.s.i.) | | |
|---|---|---|---|---|---|---|---|
| | | | | | 5 min. | 7 min. | 10 min. |
| None | 1.0 | | 0 | 11 | 1,762 | 1,976 | 2,136 |
| Do | 1.0 | | 2 | 11 | 1,788 | 2,123 | 2,150 |
| Sodium X | 1.0 | 4.0 | 0 | 20.5 | 1,500 | 1,775 | 1,975 |
| Do | 1.0 | 4.0 | 2 | 23.5 | 1,640 | 1,735 | 1,985 |
| Sodium A | 1.0 | 4.0 | 0 | 16 | 2,350 | 2,120 | 2,125 |
| Do | 1.0 | 4.0 | 2 | 19.5 | 2,146 | 2,048 | 2,190 |
| Zeolex-20 1(a) | 1.0 | 4.0 | 0 | 14 | 1,882 | 2,000 | 2,120 |
| Do 1 | 1.0 | 4.0 | 2 | 11.5 | 2,000 | 2,075 | 2,265 |
| Attasorb LVM 2(b) | 1.0 | 4.0 | 0 | 14.5 | 1,783 | 2,050 | 2,293 |
| Do 2 | 1.0 | 4.0 | 2 | 9.5 | 1,905 | 2,095 | 2,217 |

[1] An amorphous zeolite comprising precipitated hydrated sodium calcium silico aluminate.
[2] A modified Attapulgite clay, heated to 1,800° C. to drive off volatile matter.

As pointed out hereinabove, the G types can be cured without added accelerators, although better physical properties and somewhat faster cure rates can be obtained if accelerators are used. However, the scorch times when accelerators are added are generally too short. Table G shows, that in the absence of accelerators, a black neoprene GNA formulation has a rather short scorch time and cures rapidly. Addition of diethyl thiourea shortens the scorch time and gives an improvement in cure rate and physical properties. Diethyl thiourea retained on sodium X, however, gives a longer scorch time than the unaccelerated formulation and also gives a cure rate similar to that obtained with diethyl thiourea alone. Molecular sieve type sodium X, when added to a formulation containing no accelerator, had no effect on the cure rate or scorch time. This indicates that the combination of accelerator and crystalline zeolitic molecular sieve has the same unique effect in increasing the rate of cure and scorch time for type G neoprenes as has been illustrated by the data hereinabove relating to type W neoprenes.

TABLE G.—COMPARISON OF ACCELERATORS IN NEOPRENE TYPE GNA

| Accelerator | Phr. accelerator | Phr. Sodium X | Mooney scorch time at 250°F (min. to 5 pt. rise) | Press cure at 307°F., stress at 300% elongation (p.s.i.) | | |
|---|---|---|---|---|---|---|
| | | | | 5 min. | 7 min. | 10 min. |
| None | | | 10.5 | 1,247 | 1,287 | 1,310 |
| Diethyl thiourea | 0.5 | | 6.5 | 1,310 | 1,376 | 1,392 |
| Do | 0.4 | 1.6 | 15.5 | 1,250 | 1,345 | 1,436 |
| None | | 1.0 | 9 | 1,120 | 1,235 | 1,325 |

All of the accelerators of this invention may be released from the crystalline zeolitic molecular sieve by the application of heat. The rate of release increases with increasing temperature, and some accelerator may be released before the curing temperature is reached. That is, the release of the accelerator takes place over a range of temperature up to the curing temperature of the neoprene formulation.

The crystalline zeolitic molecular sieve used to carry the accelerator should be activated; that is, it should have essentially all the water removed from the pores of the zeolite in order to obtain the maximum advantage of this invention. This activation may be conveniently carried out by heating the zeolite under reduced pressure until the water is removed. The temperature required depends upon the properties of the particular zeolite. In general, a crystalline zeolitic molecular sieve is considered activated when it contains less water than its saturation value, and preferably less than about 5 percent water by weight.

The method of putting the accelerator on the solid material apparently has very little effect on the performance of the accelerator. Combining the curing accelerator with molecular sieves by a solid mixing process or by other suitable means all gave similar results when compounded into neoprene formulations.

What is claimed is:

1. A curing accelerator for polymers of chloroprene formulations consisting essentially of a crystalline zeolitic molecular sieve upon which is retained in closely bound relation an accelerator having the formula

wherein R and R' are groups selected from the class consisting of hydrogen, alkyl, aryl, cycloalkyl, aralkyl, alkaryl, and alkenyl, and G is a group selected from the class consisting of hydrogen, R-groups and

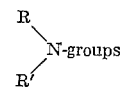

wherein R and R' have the meanings defined hereinabove, with the proviso that the accelerator molecule contains less than about twenty-five carbon atoms, said accelerator being releasable in at least one active form from said molecular sieve when heated to temperatures up to the curing temperature of said polymer of chloroprene.

2. A curing accelerator in accordance with claim 1 wherein said crystalline zeolitic molecular sieve is zeolite A.

3. A curing accelerator in accordance with claim 1 wherein said crystalline zeolitic molecular sieve is zeolite X.

4. A curing accelerator in accordance with claim 1 wherein said crystalline zeolitic molecular sieve is zeolite Y.

5. A curing accelerator in accordance with claim 1 wherein said crystalline zeolitic molecular sieve is chabazite.

6. A curing accelerator in accordance with claim 1 wherein said crystalline zeolitic molecular sieve is erionite.

7. A curing accelerator in accordance with claim 1 wherein said accelerator is diethyl thiourea.

8. A curing accelerator in accordance with claim 1 wherein said accelerator is diisopropyl thiourea.

9. A curing accelerator in accordance with claim 1 wherein said accelerator is dibutyl thiourea.

10. A curing accelerator in accordance with claim 1 wherein said accelerator is diphenyl thiourea.

11. A curing accelerator in accordance with claim 1 wherein said accelerator is trimethyl thiourea.

12. A curing accelerator for polymers of chloroprene formulations consisting essentially of previously activated synthetic crystalline zeolite X upon which is retained in closely bound relation diethyl thiourea.

13. A composition of matter comprising a curable polymer of chloroprene having incorporated therein a quantity of previously activated crystalline zeolitic molecular sieve on which is retained in closely bound relation a curing accelerator, said accelerator having the formula

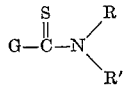

wherein R and R' are groups selected from the class consisting of hydrogen, alkyl, aryl, cycloalkyl, aralkyl, alkaryl, and alkenyl, and G is a group selected from the class consisting of hydrogen, R-groups, and

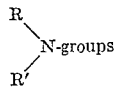

wherein R and R' have the meanings defined hereinabove, with the proviso that the accelerator molecule contains less than about twenty-five carbon atoms, said accelerator being releasable in at least one active form from said molecular sieve when heated to temperatures up to the curing temperature of said polymers of chloroprene.

14. A composition in accordance with claim 13 wherein said crystalline zeolitic molecular sieve is zeolite A.

15. A composition in accordance with claim 13 wherein said crystalline zeolitic molecular sieve is zeolite X.

16. A composition in accordance with claim 13 wherein said crystalline zeolitic molecular sieve is zeolite Y.

17. A composition in accordance with claim 13 wherein said crystalline zeolitic molecular sieve is chabazite.

18. A composition in accordance with claim 13 wherein said crystalline zeolitic molecular sieve is erionite.

19. A composition in accordance with claim 13 wherein said accelerator is diethyl thiourea.

20. A composition in accordance with claim 13 wherein said accelerator is diisopropyl thiourea.

21. A composition in accordance with claim 13 wherein said accelerator is dibutyl thiourea.

22. A composition in accordance with claim 13 wherein said accelerator is cyclohexyl thioamide.

23. A composition in accordance with claim 13 wherein said accelerator is trimethyl thiourea.

24. Process for the rapid curing of polymers of chloroprene which comprises providing a polymer of chloroprene formulation; incorporating therein a quantity of previously activated crystalline zeolitic molecular sieve on which is retained in closely bound relation a curing accelerator, said accelerator having the formula

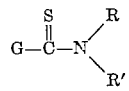

wherein R and R' are groups selected from the class consisting of hydrogen, alkyl, aryl, cycloalkyl, aralkyl, alkaryl, and alkenyl, and G is a group selected from the class consisting of hydrogen, R-groups, and

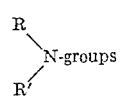

wherein R and R' have the meanings defined hereinabove, with the provisio that the accelerator molecule contains less than about twenty-five carbon atoms, said curing accelerator being releasable in at least one active form from said molecular sieve by heating to temperatures up to the curing temperature of said polymers of chloroprene formulation; and heating said formulation to said curing temperature whereby said accelerator is released and the rate of curing of said polymers of chloroprene is increased.

25. Process for the rapid curing of polymers of chloroprene which comprises providing a curable polymer of chloroprene formulation; adding to said neoprene formulation separate quantities of activated crystalline zeolitic molecular sieve and a curing accelerator having the formula

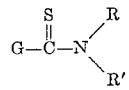

wherein R and R' are groups selected from the class consisting of hydrogen, alkyl, aryl, cycloalkyl, aralkyl, alkaryl, and alkenyl, and G is a group selected from the class consisting of hydrogen, R-groups, and

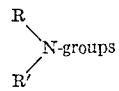

wherein R and R' have the meanings defined hereinabove, with the proviso that the accelerator molecule contains less than about twenty-five carbon atoms, said molecular sieve being present in sufficient quantity to retain essentially all of said accelerator in closely bound relation with said molecular sieve and said accelerator being releasable in at least one active form from said molecular sieve by heating to temperatures up to the curing temperature of said polymers of chloroprene formulation; and heating said formulation to said curing temperature whereby said accelerator is released from and the rate of curing of said polymers of chloroprene is increased.

26. In a process for the rapid curing of polymers of chloroprene formulations wherein said formulation includes a quantity of previously activated crystalline zeolitic molecular sieve on which is retained in closely bound relation a curing accelerator having the formula

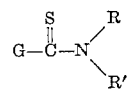

wherein R and R' are groups selected from the class consisting of hydrogen, alkyl, aryl, cycloalkyl, aralkyl, alkaryl, and alkenyl, and G is a group selected from the class consisting of hydrogen, R-groups and

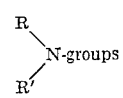

wherein R and R' have the meanings defined hereinabove, with the proviso that the accelerator molecule contains less than about twenty-five carbon atoms, said curing accelerator being releasable in at least one active form from said zeolitic adsorbent by heating said molecular sieve to temperatures up to the curing temperature of said polymers of chloroprene formulation and wherein the processing variables of scorch time and cure rate must be controlled, the steps of adjusting the accelerator-molecular sieve ratio to provide a predetermined scorch time, adjusting the amount of accelerator-retaining molecular sieve in said formulation to provide a predetermined rate of cure, and releasing said accelerator by heating said formulation to said curing temperature.

27. In a process for the rapid curing of polymers of chloroprene formulations wherein separate quantities of activated crystalline zeolitic molecular sieve and a curing accelerator having the formula

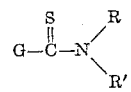

wherein R and R' are groups selected from the class consisting of hydrogen, alkyl, aryl, cycloalkyl, aralkyl, alkaryl, and alkenyl, and G is a group selected from the class consisting of hydrogen, R-groups, and

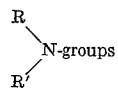

wherein R and R' have the meanings defined hereinabove, with the proviso that the accelerator molecule contains less than about twenty-five carbon atoms, are added to said formulation, said molecular sieve being present in sufficient quantity to retain substantially all of said accelerator in closely bound relation and said accelerator being releasable in at least one active form from said molecular sieve by heating to temperatures up to the curing temperature of said polymers of chloroprene formulation, and wherein the processing variables of scorch time and cure rate must be controlled, the steps of adjusting the accelerator-molecular sieve ratio to provide a predetermined scorch time, adjusting the amounts of accelerator and activated molecular sieve in said formulation to provide a predetermined rate of cure, and releasing said accelerator by heating said formulation to said curing temperature.

28. A process as described in claim 24 wherein said activated crystalline zeolitic molecular sieve is zeolite X and said curing accelerator is diethylthiourea.

29. A process as described in claim 26 wherein said activated crystalline zeolitic molecular sieve is zeolite X and said curing accelerator is diethylthiourea.

References Cited in the file of this patent
UNITED STATES PATENTS

| | | |
|---|---|---|
| 1,782,353 | Jaeger et al. | Nov. 18, 1930 |
| 2,283,172 | Bates | May 19, 1942 |
| 2,508,262 | Jennings et al. | May 16, 1950 |
| 2,804,447 | Naylor | Aug. 27, 1957 |

OTHER REFERENCES

Breck et al.: "J.A.C.S.," volume 78, No. 23, December 1956, pp. 5963–5971.